No. 764,421. PATENTED JULY 5, 1904.
E. R. BULLARD.
PHOTOGRAPHIC SHUTTER.
APPLICATION FILED APR. 28, 1902.
NO MODEL. 3 SHEETS—SHEET 1.

Witnesses
H. G. Dieterich
J. M. Fowler Jr

Inventor
Edgar R. Bullard
By Hugh M. Sterling
Attorney

No. 764,421.

Patented July 5, 1904.

UNITED STATES PATENT OFFICE.

EDGAR R. BULLARD, OF WHEELING, WEST VIRGINIA.

PHOTOGRAPHIC SHUTTER.

SPECIFICATION forming part of Letters Patent No. 764,421, dated July 5, 1904.

Application filed April 28, 1902. Serial No. 105,037. (No model.)

*To all whom it may concern:*

Be it known that I, EDGAR R. BULLARD, a citizen of the United States, residing at Wheeling, in the county of Ohio and State of West Virginia, have invented certain new and useful Improvements in Photographic Shutters; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention is a photographic shutter designed to make "bulb," "instantaneous," and "time" exposures, in which the opening and closing of the shutter are accomplished automatically and as the result of the operation of setting the shutter-operating mechanism and in which the setting and releasing of the shutter-operating mechanism are performed by mechanism preferably actuated by the usual bulb compression in the making of the various kinds of exposures.

The invention employs as one of its features a retarding device, which is brought into action and suitably controlled for the making of graded time exposures.

The primary object of the invention is the production of a shutter having the above characteristics and to attain a simplicity and rigidity of construction, avoiding as much as possible small and intricate working parts, whereby the derangement so common to photographic shutters will be reduced to a minimum, and to produce as well a compact arrangement of parts which will admit of the mechanism being practically inclosed within the shutter-case.

Another object of the invention is to render the action of the bulb compression the more prompt and effective in overcoming the resistance of the retarding device in adjusting the same for operation, thus conserving the force of the compression for the more positively setting the shutter-operating mechanism against the tension of its actuating-spring, and, further, to cause the shutter-operating mechanism to be acted on by the retarding device in such manner as to largely increase its retarding effect upon the said mechanism, thereby securing ease of operation of the retarding device, which is necessary for its easy adjustment under the bulb compression, and securing great positiveness and strength of action in retarding the shutter-operating mechanism.

Another object is to secure greater positiveness and force of action in the shutter-operating mechanism without placing the main operating-spring under a tension which requires undue force for the compression of the bulb and less promptness of the bulb action, which object is accomplished by the employment of a main motor member of such form, size, and sweep of movement as will produce a momentum force to operate the shutter, preferably by a partial unrestricted movement of such member, before it actuates the shutter.

The invention consists in the novel features hereinafter described, and pointed out specifically in the appended claims.

In the accompanying drawings, Fig. 3 is a view showing the interior of the shutter-case and disclosing certain of the shutter-operating mechanism in normal position. Fig. 4 is also an interior view of the shutter-case and in which the shutter-operating mechanism shown is in the position to which it is moved in the operation of setting the same for an exposure, the set position being indicated by dotted lines. Fig. 5 is an interior view of the shutter-case, disclosing the shutter by the removal of the interior plate carrying the shutter-operating mechanism, in which view are shown those elements of the shutter-operating mechanism which are operative upon the rear of the interior plate and certain of the mechanism for setting the shutter to make time and bulb exposures. Fig. 6 is an enlarged detail view in cross-section, taken on the line of Figs. 3 and 5. Fig. 7 is a view similar to Fig. 6, showing the shutter-operating pin depressed by the main motor member of the shutter-operating mechanism in its movement in one direction. Fig.

8 is an enlarged rear view of a catch-carrying lever by which the shutter is set for various exposures.

Referring to the drawings, 1 indicates the shutter-case, adapted for attachment to a camera and to receive the usual lens-tube. It is provided with the usual "iris" diaphragm, the operating-lever therefor being shown at 2, with its terminal pointer 3 operating in connection with a scale 4, by which the size of the opening of the diaphragm may be graded. The present invention preferably employs two oppositely-moving shutter-leaves 5 and 6, which are pivoted at 7 and 8, respectively, Figs. 3 and 5, to a plate or partition 9, forming the main mounting for the shutter mechanism. These shutter-leaves overlap each other and are formed each with a radial slot 10 adjacent its pivot, which slots are adapted to register when the leaves are in their closed position, and within which slots projects a movable pin 11, that constitutes the means for simultaneously vibrating the leaves.

Figures 3, 4, 5, 6, 7, 8:
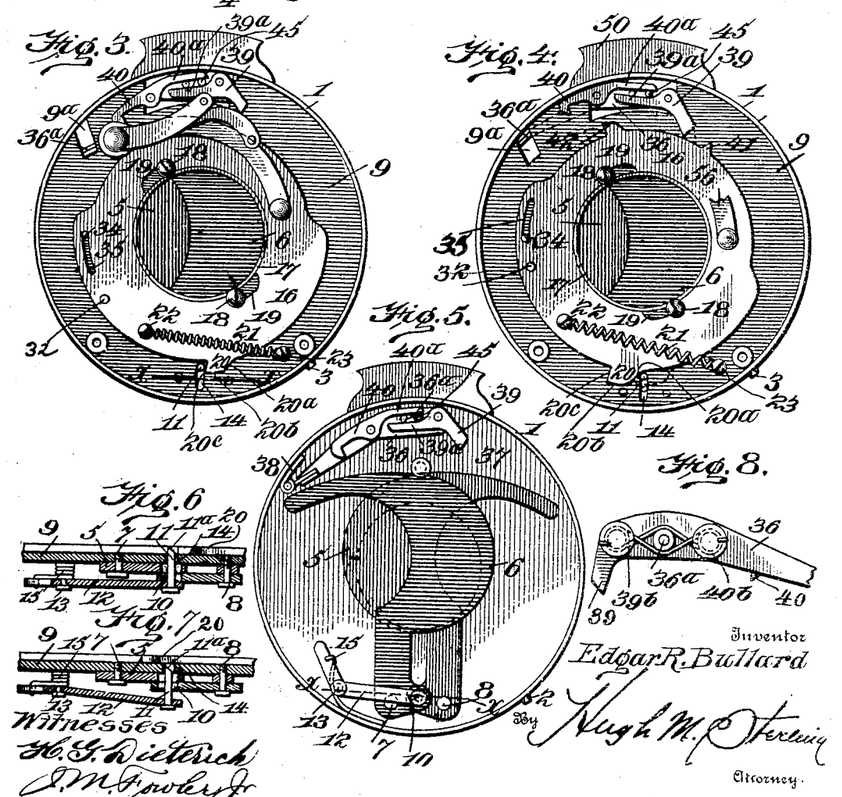
Figure 9:
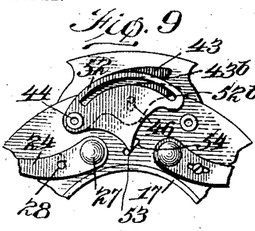
Fig. 9 is a view of a portion of the front plate of the case, disclosing the cams for controlling the shutter mechanism to make the various exposures, the inclosing case for the cams being removed.

The manner in which the pin 11 operates to open and close the shutter-leaves and the operation and construction of its directly-associated parts will be seen by reference particularly to Figs. 5, 6, and 7. The pin is carried at the end of a lever or arm 12, pivoted at 13 to the plate 9, and projects through the slots 10 of the shutter-leaves and the slot 14 in the said plate 9, which slot 14 limits the movement or swing of the lever 12. This pin-carrying lever or arm is operated on by spring 15, which normally maintains the pin 11 at the upper or inner end of the slot 14, in which position the shutter-leaves remain closed, and said spring is also relied upon to actuate the shutter-leaves for their closing movement.

Figure 17:
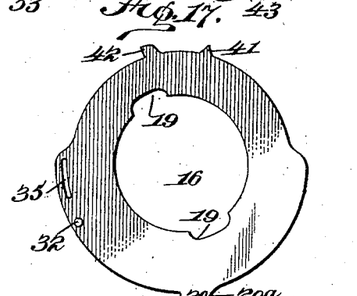
Fig. 17 is a detached view of the motor member.
Figure 18:
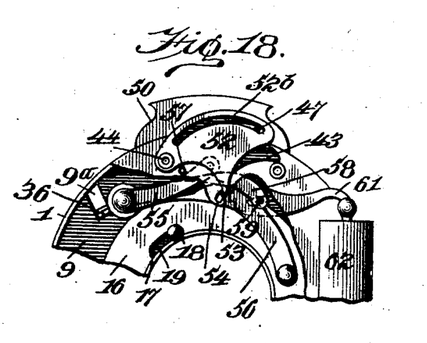
Fig. 18 is a view showing a partly-broken-away portion, disclosing the elements of the retarding device and showing their controlling-cam thrown into position to make an exposure of one second's duration, the position of the parts being that occupied by them before the motor member has been moved into set position.
Figure 19:
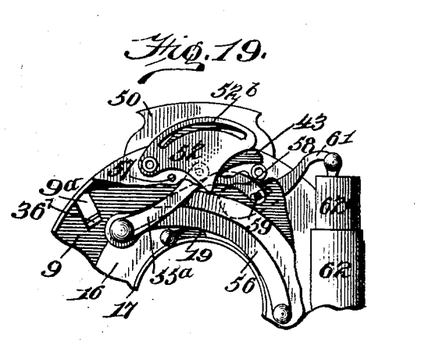
Fig. 19 is a view similar to Fig. 18, in which the movable elements of the retarding mechanism are shown in the position assumed upon the movement of the motor member into position for operating the shutter mechanism.
Figure 20:
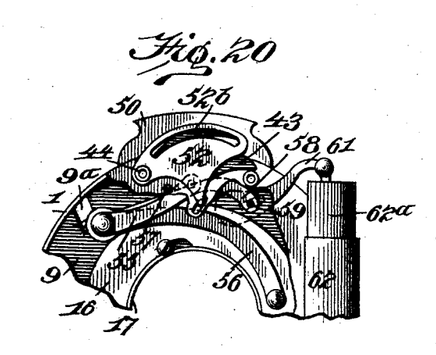
Fig. 20 is a view similar to Fig. 19, but showing the change of position of the movable elements immediately upon the return movement of the motor member.
Figure 21:
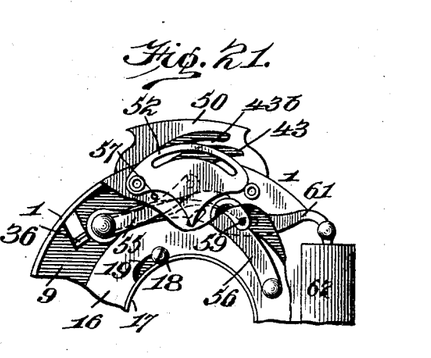
Fig. 21 is a view of the same character as Fig. 18, showing the shutter adjusted for time exposures, in which position the controlling-cam of the retarding device is out of action.
Figure 22:
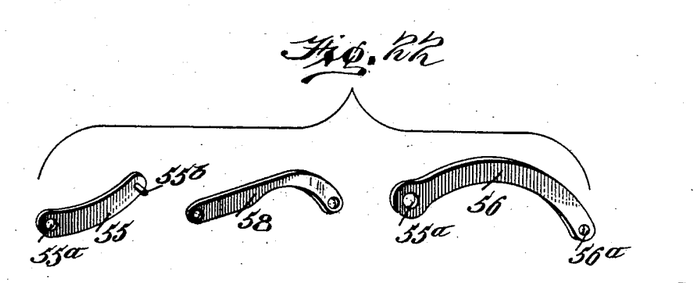
Fig. 22 represents perspective views of the connecting elements of the retarding mechanism.

For the opening of the shutter-leaves and for forming the main motive element of the shutter-operating mechanism suitable for effecting the several objects contemplated there is employed a motor member 16, Fig. 17, in the form of a centrally-apertured plate partially rotative on the plate 9 and the flange 17, formed thereon about the shutter-aperture and which is limited in its movement, held in place and largely guided by the headed pins 18, working in segmental slots or recesses 19, formed therein. This motor member is formed with a peripheral projection 20 for contact with the shutter-operating pin 11, which projection presents an inclined or cam face $20^a$ for moving said pin outward to open the shutter-leaves, a contact-face $20^b$, which holds the pin in its outward position during a part of the movement of the motor member, and a shoulder or face $20^c$, which permits the pin upon further movement of the motor member to instantly return to its normal position at the inner end of its slot and under the action of its actuating-spring close the shutter-leaves. The motor member acts upon the pin 11 to open the shutter-leaves under the action of the coil-spring 21, which is connected at one end to the said member at 22 and to the plate 9 at 23. The normal position of this motor member is as shown in Fig. 3, the spring 21 exerting its force to maintain this position at all times, and especially to return said member to such position when moved into the position shown in Fig. 4. This latter position may be termed the "set" or "operative" position, as it is only when released from this position that the motor member acts upon the shutter-leaves. In its normal position the motor member presents the straight face $20^c$ of its cam projection 20 to the pin 11, which to render it unobstructing to the movement of the motor member when said member is being moved into set or operative position presents an inclined end face $11^a$ to said cam projection and is depressible under the contact with said cam projection, Fig. 7, the resiliency of its carrying-lever 12 being relied upon for this action. The size of this motor member as compared with the parts operated thereby and the sweep of its movement are such as to produce positiveness and promptness of action, especially in opening the shutter-leaves by its cam action, a slight movement before the pin 11 rides the face of the cam being alone necessary to bring the momentum of the motor member to assist in the accomplishment of these ends and admitting at the same time of the use of a spring of minimum tension, with the advantage heretofore stated.

Figure 1:
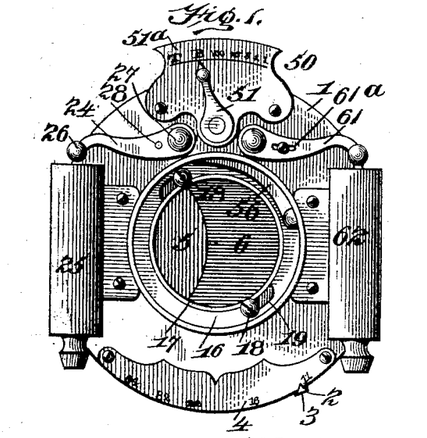
Figure 1 is a front face view of the shutter.
Figure 2:
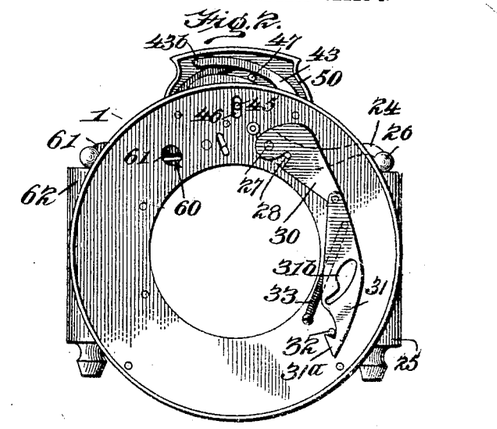
Fig. 2 is a rear view of the front face-plate of the shutter-case, showing certain parts of the shutter mechanism carried thereby.
Figure 15:
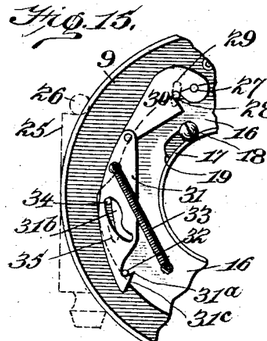
Fig. 15 is an interior view of a portion of the shutter, showing the connections between the pneumatic device and the motor member.
Figure 16:
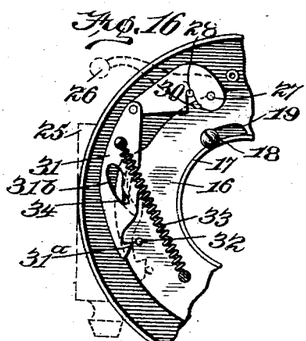
Fig. 16 is a view similar to Fig. 15, showing the position of the movable parts there shown in their raised position.

The lever 24 constitutes the main operating member of the device, being preferably actuated by the usual bulb compression through the agency of the well-known pneumatic device 25, upon the head of the movable cylinder of which the free end of said lever rests, a ball 26 rendering the movable contact less frictional and rendering the lever independent of the pneumatic device for operation directly by hand when so desired. Adjacent its pivot 27 said lever is provided with an inwardly-projecting pin 28, which works in a slot 29 in the front plate of the shutter-case and operates to raise a lever 30, attached to the inner face of the front plate, Figs. 2, 15, and 16, by pivot 27, said lever 30 being slotted to receive the pin 28, but which permits the main lever 24 to lower independently of lever 30. The lever 30 carries at its end a pivoted hook member 31, which makes connection with the motor member 16 by the engagement of the hook $31^a$ with a pin or stud 32 of the motor member, and by which connection movement is imparted to the motor member to move the same into operative position upon the raising of the levers 24 and 30. This connecting member 31 is designed to effect the release of the motor member therefrom upon the said motor member reaching the limit of its primary movement in order that its return or shutter-operating movement may take place independent of the movement of the connecting member 31 and its levers 30 and 24, principally for the purpose of preventing the motor member from being encumbered in its return movement with the work of overcoming the resistance offered by the pneumatic device and these intermediate connecting parts and also to admit of the operation and control by said lever 30 of mechanism by which the motor member is detained at a point of its shutter-opening movement to make an exposure of some duration, as it will hereinafter more fully appear. To bring about the prompt return of levers 24 and 30 and the connecting member 31, a light coil-spring 33 is provided, which connects said member with the front face of the shutter-case and exerts a force sufficient to cause the hook $31^a$ to move into and be normally maintained in engagement with the pin 32 of the motor member. For effecting this engagement, as well as the release therefrom, the member 31 is formed with a cam-slot $31^b$ of peculiar construction, into which projects a pin 34, affixed to the plate 9, the motor member being provided with a segmental slot 35 to admit of the location of said pin, as shown. This cam-slot $31^b$ is arranged obliquely to the direction of movement of the motor member in order that the hook $31^a$ will be directed away from the pin 32 on reaching a predetermined point in its rising movement and be moved finally clear of engagement with the pin. The action of the cam-slot on the descent of the hook member 31, while holding the hook $31^a$ out of the path of pin 32 to prevent accidental engagement therewith on the return movement of the motor member, is such as to direct the hook inward to effect its engagement with the pin 32 when said pin is in its lowermost or normal position, and in order that the hook $31^a$ may not be directed on the wrong side of the pin the end of the hook member is formed to present an inclined guide-face $31^c$, which is directed against the pin by the cam-slot and serves to swing the hook slightly outward against the action of the spring 33 until the point of the hook is passsed, whereupon engagement is effected by the return or inward swinging movement of the hook. It will be noticed that the slot $31^b$ is formed with an enlarged portion which is reached by the pin 34 when the contact-face $31^c$ has come into contact with the pin 32, which enlargement of the slot permits the necessary outward movement of the member 31 for the purpose of the above-mentioned engagement, the position of the parts at this point of the movement being clearly shown by dotted lines in Fig. 16.

The device as thus far described includes only those elements that are necessary for the making of instantaneous exposures, but which are designed to coact with devices by which the shutter may be set to make bulb and time exposures.

The main element of the setting mechanism is a catch-carrying lever 36, pivoted within the case at $36^a$ to plate 37, Fig. 5. The position of this lever is such as to bring a lateral end projection $36^b$ within the path of the motor-actuating lever 30, the plate 9 being formed with a slot $9^a$ for this purpose and to permit of the movement of said projection up and down. A spring 38 is employed to maintain the lever 36 in its lowered position and to return it to such position on the downward movement of the lever 30, Figs. 3 and 5.

Adjacent its pivot and on opposite sides thereof the lever 36 is provided with two spring-actuated pivoted catches 39 and 40, respectively, which are arranged to lie in opposite directions and have their arms 39ª and 40ª, by which they are controlled, overlapping each other for the purpose of being operated upon by a setting device to be presently referred to in detail. The rear view shown in Fig. 8 shows the application of the catch-actuating springs 39$^b$ and 40$^b$, which springs are shown formed of a single piece of wire coiled about the pivots of each catch and fastened to each pivot-head, the pivots being rigid on the catches. The normal position of the catches 39 and 40 with relation to their carrying-lever 36 is as shown in Figs. 3, 4, and 5 and in which position the catch 39 will be lowered as the main arm of the lever 36 is raised by the lever 30 and during the movement thereby of the motor member in one direction, so that upon the release of the motor member from the action of its operating-lever said motor member will be arrested in its return movement by catch 39 coming in contact with a projection 41, formed on the periphery of the motor member and at such a point thereon as to allow the said member to make a part of its return movement to open the shutter-leaves before it is arrested. This arresting of the motor member at a point when the shutter-leaves are opened will continue so long as the lever 36 is maintained in its raised position, which when a bulb is used will be governed by the length of the bulb compression.

Figure 13:
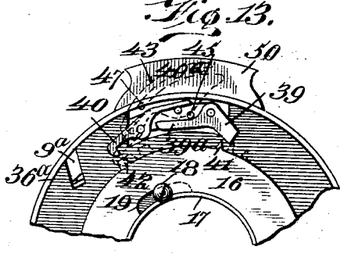
Fig. 13 is an interior view of a portion of the shutter in which the cam for controlling the catches is shown in dotted lines in its raised position, whereby to cause the said catches to successively engage the motor member, as when making time exposures.

When it is desired to make what are termed "time" exposures, as by employing one compression of the bulb to make the exposure by arresting the motor member after it has opened the shutter-leaves, as above, and to release it by a second compression of the bulb, the catch 40 is brought into action by first making a change of its position, as shown by Fig. 13, so that upon the lowering movement of the lever 36 this catch will immediately engage a projection 42 on the motor member while the catch 39 is being disengaged, thus transferring the arresting action from one catch to the other without imparting movement to the shutter-leaves and permitting the lever 36 to assume its normal position, where it will require to be raised, as by a second compression of the bulb, to effect the release of the motor member and the termination of the duration of exposure.

Figure 10:
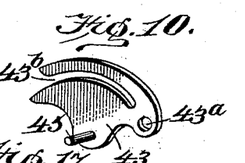
Fig. 10 is a perspective view of the cam for controlling the catches for the making of time and instantaneous exposures.
Figure 11:
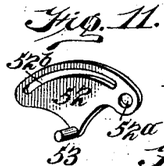
Fig. 11 is a perspective view of the cam for controlling the operation of the retarding device.
Figure 12:
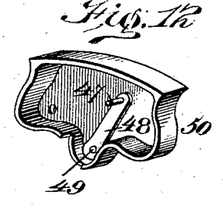
Fig. 12 is a perspective view of the inclosing case for the controlling-cams, together with the cam-operating pin and arm carrying said pin.
Figure 14:
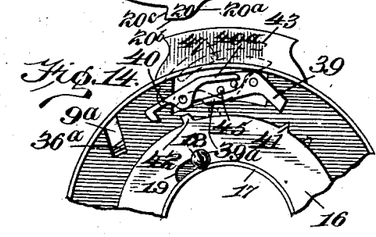
Fig. 14 is a view similar to Fig. 13, in which is shown in dotted lines the position of the catch-controlling cam when the shutter is adjusted for instantaneous or graded time exposures, both catches being held out of engagement with the motor member.

The adjustment of the catches 39 and 40 for the various exposures is effected through the agency of a plate or member 43, Fig. 10, pivotally mounted at one side on a stud 44, affixed to the front face of the shutter-case. The said plate is provided with aperture 43ª to receive the said stud, and from one face of the plate there projects a pin 45, which extends into engagement with the arms 39ª and 40ª of the catches and through a slot 46 in the face-plate, Fig. 2, which slot permits of the raising and lowering movement of said pin to effect a change in the position of the catches. For the purpose of imparting movement to the plate 43 it is formed with a curved slot 43$^b$, adapted for a part of its length to be eccentric with the arc traversed by its operating-pin 47, Fig. 2. This cam-operating pin 47 projects from an arm 48, pivoted at 49 within a case 50, which forms a housing for the cam-plate 48 and a cam-plate for controlling the operation of the retarding mechanism to be hereinafter referred to. The arm 48 corresponds in position and is movable with the pointer-arm 51, Fig. 1, on the face of the case 50, which pointer-arm is moved with reference to the scale 51ª to effect the proper movement of the two cam-plates. Figs. 1, 2, 3, 4, 5, 9, and 12 illustrate the shutter as set for bulb exposure, in which the position of the cam-controlled pin 45 is such as to have no effect upon the catches and merely extends between the arms thereof, as shown in Fig. 3. Upon moving the pointer-arm to "T" of the scale the action of the pin 47 will be to raise the cam-plate 43 and its pin 45, thereby changing the position of catch 40, so that it will operate to engage the motor member upon the release thereof by catch 39, as heretofore explained, Fig. 13. Movement of the pointer-arm to "100" or farther to the right thereof will cause the cam-plate 43 to lower, permitting catch 40 to return under the action of its spring to its normal position and raising catch 39 out of a position for action on the motor member, as will be seen by reference to Fig. 14. When the catches are in the position shown in this view, the exposure will be instantaneous or graded, according to the degree in which the retarding device is brought into action, which is practically imperceptible at "100" of the scale. Slightly before the pointer-arm has reached "100" the action of the pin 47 is practically transferred to the cam-plate 52, by which the retarding device is brought into action and made variable in its retarding effect. This cam-plate is pivotally mounted on the stud 44, having aperture 52ª for the mounting thereof and lies upon the catch-controlling cam-plate 43. A pin or projection 53 is carried by the cam-plate 52, which pin extends through and has movement in a slot 54 in the face-plate of the shutter-case and forms a movable fulcrum to one of the elements by which the retarding device is connected to the motor member 16. A curved slot 52$^b$ in the plate 52 forms the cam-surfaces for operation upon by the pin 47, causing said plate to operate after the manner of cam-plate 43, the said slot being so formed as to conform partly to the arc traversed by the pin 47 and partly to be eccentric thereto, the slots of the two cam-plates being so arranged with relation to each other as to cause action of the plates successively under the movement of the said operating-pin—that is, during the movement of one cam the said pin will have no effect upon the other—one portion of the slot of the other cam corresponding during said movement with the arc of the pin travel.

Attention will now be especially directed to Figs. 18, 19, 20, and 21, which are designed to show the elements of the retarding mechanism and the manner in which they operate.

Two main arms or members 55 and 56 are pivotally joined, as at $55^a$, the free end of member 55 being pivoted to the inner face of the front plate of the shutter at $55^b$ and the free end of member 56 pivoted at $56^a$ to the motor member. These members by reason of their points of attachment have an acute-angle arrangement and are curved, so that member 56 will not extend across the shutter-aperture or the member 55 interfere with the fulcrum-pin 57 during the swinging movement of said member. By reason of the pivotal connection of the swinging member 55 with the link member 56, movable with the motor member, and the substantially horizontal position of said swinging member their point of juncture $55^a$ is lowered and raised according as the motor member is operated, a slight lateral movement being present at the same time. Pivotally connected at one of its ends to the said members at their juncture $55^a$ is an arm or member 58, which carries a pin 59 at its free end, which pin extends through an aperture 60 in the front of the case, Fig. 2, and connects with the lever 61 of the retarding device 62. This pin 59 has movement within a slot $61^a$ of lever 61, whereby to permit the lateral movement of the member 58 during the ordinary working of the shutter without actuating the lever 61. Under normal conditions the arm or member 58 has no active function, but receives a slight lengthwise or lateral movement as well as movement up and down of its pivoted end at $55^a$. Upon the cam 52 being adjusted to bring its pin 53 under the arm 58, Fig. 18, said arm is transformed into a lever and the character of its movement changes, with the result that upon the movement of the motor member 16 to its operative position the pin-carrying end of said member 58 will have been raised to the position shown in Fig. 19, raising also the lever of the retarding device 62, which raising movement will be regulated by the bringing of the fulcrum-pin 53 into a lower or higher position. The chief function of this fulcrum-pin being to raise the lever of the retarding device in addition to regulating the distance of movement of said device, it is applied near the lifting end of member 58, so that the leverage will overcome with an expenditure of slight power the resistance offered by the movable cylinder $62^a$ of the retarding device. This order, however, is changed in the action of the retarding device on the motor member 16 in its return movement, as in this movement the stationary fulcrum 57 is brought into action, and for the purpose of lessening the leverage, and thereby increase the retarding effect, said fulcrum 57 is placed farther away from the retarding device and fulcrum 53. It will be seen by reference to Figs. 19 and 20 that after the retarding-cylinder is raised the resistance offered by it momentarily makes a fixed point of the pin-carrying end of lever 58, which will cause the return movement of the motor member to first raise the other end of said lever and bring it into contact with the fulcrum-pin 57 before any depression of the cylinder $62^a$ can take place and cause retardation. Thus the fulcrums 53 and 57 by their arrangement and location allow a certain play of movement of the member 58, acted on thereby, which permits the motor member to have slight movement before bringing into operation the retarding action and during which slight movement the shutter-leaves are caused to open by the action of the motor cam-face $20^a$ in contact with the shutter-operating pin, while the retarding action will occur while the face $20^b$ of the cam projection is moving past the shutter-operating pin.

It may be stated with reference to the change of leverage through which the retarding device operates and is operated that not only does such change of leverage enable the retarding device to be set for action by a slight power, as heretofore stated, but also admits of the employment of a retarding device offering in itself slight resistance, but making a greatly-increased retarding effect through its application to the shutter-operating mechanism.

The grading of the duration of exposure is effected by increasing or decreasing the throw of the retarding-cylinder by controlling the sweep of its operating-lever, as stated, through an adjustable fulcrum member applied to an intermediate connecting member that is convertible into a lever by the application of the fulcrum member thereto and made variable in its sweep of movement by the movement of the fulcrum member to different positions.

Having thus fully described my invention, what I claim as new, and desire to secure by Letters Patent, is—

1. In a photographic shutter, one or more shutter-leaves, a spring-actuated member for closing the shutter-leaves, comprising a main movable element and a leaf-operating projection carried thereby and adapted to yield transversely to its leaf-operating movement, and a motor device adapted to engage said projection and by movement in one direction to move same to open the shutter-leaves, and by movement in the opposite direction to depress said projection from the path of the motor device, substantially as and for the purpose set forth.

2. In a photographic shutter, one or more shutter-leaves, an oscillating motor device having an opening coincident with the exposure-opening of the shutter, mechanism for operating the shutter-leaves, adapted to be actuated by the motor device in its movement in one direction, mechanism for moving said motor device in the opposite direction, adapted to automatically disconnect from the motor device at a predetermined point in its movement, substantially as and for the purpose set forth.

3. In a photographic shutter, one or more shutter-leaves, an oscillating motor device having an opening coincident with the exposure-opening of the shutter, mechanism for operating the shutter-leaves, adapted to be actuated by the motor device in its movement in one direction, and mechanism for moving the motor device in the opposite direction, comprising an operating member, and a swinging catch connection between said operating member and the motor device, substantially as and for the purpose set forth.

4. In a photographic shutter, one or more shutter-leaves, a motor device adapted to slide in a path about the exposure-opening and adapted to operate the leaves by movement in one direction, mechanism for moving said device in the opposite direction for return action, said mechanism comprising an operating member, and a swinging catch carried thereby, means for causing said catch to engage said motor device in its normal position, and means whereby said catch is caused to swing out of engagement with said motor device at a predetermined point in its movement, substantially as and for the purpose set forth.

5. In a photographic shutter, one or more shutter-leaves, an oscillating annular motor device having an opening coincident with the exposure-opening of the shutter mechanism for operating the shutter-leaves, adapted to be actuated by the motor device in its movement in one direction, and mechanism for moving said motor device in the opposite direction, adapted to automatically disconnect from the motor device at a predetermined point in its movement, substantially as and for the purpose set forth.

6. In a photographic shutter, one or more shutter-leaves, an oscillating annular motor device having an opening coincident with the exposure-opening of the shutter, mechanism for operating the shutter-leaves, adapted to be actuated by the motor device in its movement in one direction, an operating member for moving said motor device in the opposite direction, a swinging catch connection between said operating member and the motor device, and means for moving said connection out of engagement with the motor device at a predetermined point in its movement, substantially as and for the purpose set forth.

7. In a photographic shutter, one or more shutter-leaves, an oscillating annular motor device having an opening coincident with the exposure-opening of the shutter, mechanism for operating the shutter-leaves, adapted to be actuated by the motor device in its movement in one direction, an operating member for moving said motor device in the opposite direction, a swinging catch carried by said member, means for causing said catch to engage said motor device in its normal position, means whereby said catch is caused to swing out of engagement with the motor device at a predetermined point of the movement, substantially as and for the purpose set forth.

8. In a photographic shutter, the combination with the case, the exposing mechanism, and a motor device mounted to oscillate about the exposure-opening, of a main operating-lever on the exterior of said case to move said motor device in one direction, a lever within the case, a connection between said levers, and an automatically-releasable connection between said interior lever and the motor device, substantially as and for the purpose set forth.

9. In a photographic shutter, the combination with the case and exposing mechanism, of a motor device mounted to oscillate about the exposure-opening, and adapted to actuate the exposing mechanism by movement in one direction, an operating member for moving said motor device in the opposite direction, an automatically-releasable connection between the operating member and the motor device, and a catch-lever for detaining said motor device in actuating position, operative by said operating-lever, substantially as and for the purpose set forth.

10. In a photographic shutter, the combination with the case and exposing mechanism, of a motor device for operative the exposing mechanism, an operating member for moving said motor device into operative position and operative independent thereof after such movement, a member operative by said operating member, having a catch adapted to be thrown into engagement with the motor device during the initial movement of said operating member, a spring for returning said catch-carrying member, and a catch carried by said catch member, adapted to engage and detain the motor device upon the return movement of said catch member, whereby the motor device is adapted to be released by a second operation of the operating member, substantially as and for the purpose set forth.

11. In a photographic shutter, the combination with the case and exposing mechanism, of a motor device for operating the exposing mechanism, an operating member for moving said motor device into operative position and operative independent thereof after such movement, a lever operative by said operating member, and carrying an adjustable catch, and means for controlling said catch whereby to throw the same into and out of coöperative relation with the motor device, substantially as and for the purpose set forth.

12. In a photographic shutter, the combination with the case and exposing mechanism, of a motor device for operating the exposing mechanism, an operating member for moving said motor device into position for return action and operative independent thereof after such movement, a member operated by said operating member, and carrying a primary and a secondary movable catch, a controlling member for said catches, substantially as and for the purpose set forth.

13. In a photographic shutter, the combination with the case and exposing mechanism, of a motor device for operating the exposing mechanism, an operating member for moving said motor device into position for return action and operative independent thereof after such movement, a pivoted member operated by said operating member, and carrying a primary and a secondary movable catch, adapted to successively engage the motor device by the vibratory movement of said pivoted member and controlling means for said catches, operative between said catches and adapted to throw one catch out of action by movement of said means from its normal position in one direction, and throw the other catch into action by movement from said normal position in an opposite direction, substantially as and for the purpose set forth.

14. In a photographic shutter, the combination with the case and exposing mechanism, of a motor device for operating the exposing mechanism, an operating member for moving said motor device into position for return action and operative independent thereof after such movement, a pivoted member operated by said operating member, and carrying a primary and a secondary movable catch, a controlling-cam for said catches, carrying a stud adapted to occupy an inoperative position between said catches and to throw one catch out of action by movement of said stud from its normal position in one direction, and throw the other catch into action by movement from the normal position in an opposite direction, and setting means for operating said controlling-cam, substantially as and for the purpose set forth.

15. In a photographic shutter, the combination with the exposing mechanism, of a motor device having an operating-face for actuating the exposing mechanism, and carrying a primary and a secondary catch, a main operating member having an automatically-releasable connection with the motor device, a device for coöperation with the primary motor-catch, operable by the main operating member to throw same into engagement with said primary catch, and automatically returnable, and a device for coöperating with the secondary catch, operating automatically to engage said secondary catch upon the release of the motor device by the other catch-engaging device, and releasable through a second operation of the main operating member, substantially as described.

16. In a photographic shutter, the combination with the exposing mechanism, of a slidable motor device adapted to oscillate in a path about the exposure-opening, and having a cam-face for operating the exposure mechanism, and a main operating member having an automatically-releasable connection with the motor device, substantially as described and for the purpose set forth.

17. In a photographic shutter, the combination with the case and exposing mechanism, of a motor device, means for moving the motor device against its motive action, a retarding device, a link member connecting said device with the motor device, and a shiftable fulcrum member for engagement with said link member, substantially as described.

18. In a photographic shutter, the combination with the case and exposing mechanism, of a motor device, means for moving the motor device against its motive action, and a retarding device adapted to be actuated by said motor device through a leverage to set the same, and to act upon said motor device through a decreased leverage, substantially as described.

19. In a photographic shutter, the combination with the case and exposing mechanism, of a motor device, means for moving the motor device against its motive action, a retarding device, a member connecting said retarding device with the motive device, and adapted to act upon the retarding device through leverage, a fulcrum member adapted to be engaged by said connecting member during the setting action of the motor device, and a fulcrum member adapted to be engaged by said connecting member during the return movement of the motor device, substantially as described.

20. In a photographic shutter, the combination with the case and exposing mechanism, of a motor device, means for moving the motor device against its motive action, a retarding device, a lever connected to the retarding device, a link member connected to said lever, a swinging supporting member for said link member, a member connecting said supporting member with the motor device, and a fulcrum member adapted to be moved into contact with the link member, substantially as described.

21. In a photographic shutter, the combination with the case and exposing mechanism, of a motor device, means for moving the motor device against its motive action, a retarding device, a lever connected to the retarding device, a link member connected to said lever, a swinging supporting member for said link member, a member connecting said supporting member with the motor device, a fulcrum member adapted to be engaged by the link member during the setting action of the motor device, and a fulcrum member adapted to be engaged by said link member during the return action of the motor device, substantially as described.

22. In a photographic shutter, the combination with the case and exposing mechanism, of a motor device, means for moving the motor device against its motive action, a retarding device, means connecting said device with the motor device, a movable fulcrum adapted to coöperate with said connecting means, a cam for controlling said fulcrum, and means for operating said cam, substantially as described.

23. In a photographic shutter, the combination with the case and exposing mechanism, of a motor device, means for moving the motor device against its motive action, a retarding device, a link member connecting said retarding device with the motor device, and a fulcrum on opposite sides of said link member, adapted to engage the same at different points of the length of said link member, substantially as described.

24. In a photographic shutter, the combination with the case and exposing mechanism, of a motor device, means for moving said device against its motive action, means for arresting said motive action to hold the shutter set for operation, a retarding device, a cam carrying means for throwing said arresting means into and out of action, a cam for controlling the retarding device, and setting means for operating said cams successively in its movement back and forth, substantially as described.

In testimony whereof I affix my signature in presence of two witnesses.

EDGAR R. BULLARD.

Witnesses:
R. J. BULLARD,
ALLELA BULLARD.